United States Patent
Quesnel et al.

(10) Patent No.: US 6,805,596 B2
(45) Date of Patent: Oct. 19, 2004

(54) COMPRESSION FORMED CONNECTOR FOR A COMPOSITE CONDUCTOR ASSEMBLY USED IN TRANSMISSION LINE INSTALLATIONS AND METHOD OF CONSTRUCTING THE SAME

(75) Inventors: Wayne L. Quesnel, Spartanburg, SC (US); Richard A. Bragg, Spartanburg, SC (US)

(73) Assignee: Alcoa Fujikura Limited, Franklin, TN (US)

(*) Notice: Subject to any disclaimer, the term of this patent is extended or adjusted under 35 U.S.C. 154(b) by 55 days.

(21) Appl. No.: 10/123,916

(22) Filed: Apr. 16, 2002

(65) Prior Publication Data

US 2003/0194916 A1 Oct. 16, 2003

(51) Int. Cl.[7] .......................... H01R 4/10; H01B 43/00
(52) U.S. Cl. ...................... 439/877; 174/84 C; 29/861; 29/862
(58) Field of Search ................... 439/784, 462, 439/805, 578, 675, 598, 579–585, 877; 174/84 R, 74 R, 73.1, 75 C, 84 C; 29/861, 862, 857

(56) References Cited

U.S. PATENT DOCUMENTS

| | | | |
|---|---|---|---|
| 3,384,704 A | | 5/1968 | Vockroth .................. 174/90 |
| 3,566,007 A | * | 2/1971 | O'Keefe et al. ............ 439/877 |
| 3,824,686 A | * | 7/1974 | Forney, Jr. ................. 29/862 |
| 3,877,773 A | * | 4/1975 | Doty et al. ................. 439/406 |
| 4,183,686 A | | 1/1980 | De France .................. 403/11 |
| 4,453,034 A | * | 6/1984 | Annas et al. ............ 174/84 C |
| 4,496,212 A | | 1/1985 | Harvey ..................... 350/96.2 |
| 4,719,315 A | * | 1/1988 | Gregorac ................... 439/882 |
| 4,719,672 A | | 1/1988 | Apperson et al. ........ 24/135 R |
| 5,490,803 A | * | 2/1996 | McMills et al. ............. 29/857 |
| 5,499,448 A | * | 3/1996 | Tournier et al. ............. 29/863 |
| 5,647,046 A | | 7/1997 | Cowen et al. ............. 385/136 |
| 5,798,153 A | * | 8/1998 | Fay et al. ................. 174/84 R |
| 6,015,953 A | * | 1/2000 | Tosaka et al. ............ 174/84 C |
| 6,119,543 A | * | 9/2000 | Webb ........................ 74/502.4 |
| 6,173,103 B1 | | 1/2001 | DeFrance .................. 385/136 |
| 6,173,104 B1 | | 1/2001 | Polidori .................... 385/136 |
| 6,340,250 B1 | | 1/2002 | Auclair ....................... 385/87 |
| 6,616,462 B2 | * | 9/2003 | Saitoh ........................ 439/72 |

\* cited by examiner

Primary Examiner—P. Austin Bradley
Assistant Examiner—Briggitte R. Hammond
(74) Attorney, Agent, or Firm—Tracey D. Beiriger

(57) ABSTRACT

A connector assembly for use in transmission line installations. An elongated steel tube is provided and an aluminum sleeve is axially inserted into the tube and exhibits a rate of extrusion greater than the tube. A current carrying cable has a plurality of outer strands and a central extending plurality of inner strands which insert within the sleeve. The tube is subjected to a mechanically compressing and area reducing procedure such that the sleeve extrudes at a rate greater than the tube and the aluminum material associated with the sleeve fills irregularities existing between the inner strands. The sleeve also establishes stress relief between the wire strands and the tube. An aluminum outer tubular body is slidably engaged over the assembled tube and sleeve and is mechanically compressed at specified locations in order to secure about the outer strands of the cable.

20 Claims, 5 Drawing Sheets

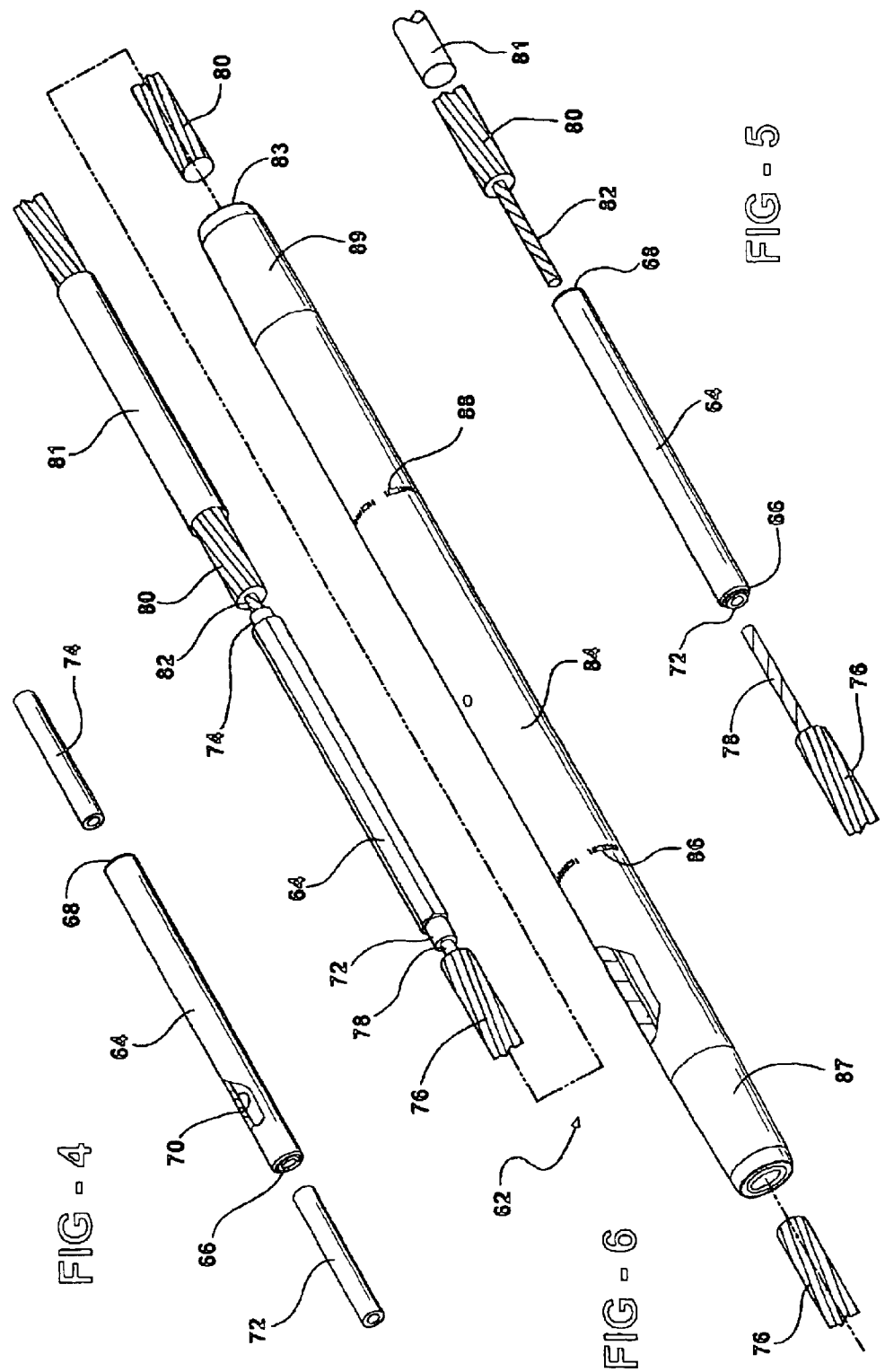

COMPRESSION FORMED CONNECTOR FOR A COMPOSITE CONDUCTOR ASSEMBLY USED IN TRANSMISSION LINE INSTALLATIONS AND METHOD OF CONSTRUCTING THE SAME

FIELD OF THE INVENTION

The present invention relates generally to compression dead-end and compression joint connector assemblies. More particularly, the present invention discloses a compression connection assembly for use in both dead-end and mid-joint conductors, such as are further typically employed in transmission line installations, as well as a method for constructing such a connection assembly.

BACKGROUND OF THE INVENTION

Connector assemblies are generally known in the art and such as is are particularly used with high current transfer (power) cables utilized in conventional transmission line applications. Such conductor lines typically incorporate outer layers of such as high temperature aluminum strands, as well as inner layers or "core" of such as aluminum matrix composite wires. It is also known that this conductor core exhibits fairly significant longitudinal strength, on the order of 240 kips per square inch (ksi) while that the same time having limited (typically on the order of 20 ksi) transverse strength properties.

In application, it is desirable to communicate the extending end of a given length of power cable, in both an insulated and effective current conducting fashion and such as to a succeeding and interconnecting length of cable. Alternatively, another conventionally known connection for such a current transfer line is to an insulator string associated with an overhead tower or transmission support structure and such as is conventionally known as a "dead-end" connection.

In establishing either of the above types of connections, it is further desirable in the art to compress an encircling tube or barrel, typically constructed of steel, and associated with the connector assembly. A composite core of the current transfer line is inserted into one end of the steel barrel, the barrel subsequently being subjected to an area reduction/compression operation (operating at pressures of 10,000 psi or more) and upon inserting the barrel between a pair of heavy duty compression dies. The objective of this operation is to fixedly secure the current conductive core within the steel jacket and in the desired current carrying manner with respect to the succeeding cable or dead-end connector.

A specific problem uncovered in the compression of the steel barrel is the tendency of the core to damage or fracture as a result of it subsequent tensioning after installation and in use. It has also been determined to be desirable to establish a tensioning grip to the core in use up to 95% of its rated strength. The core must further be maintained in a substantially linear extending fashion during the initial mechanical die compression, else the subsequently applied tension will focus only on a portion of its strands, resulting in damage by crushing, notching or bending of the core.

It has also been determined that, as the composite core exhibits fairly low ductility elongation properties, it is required that the outer strands of the current carrying cable be loaded prior to those of the core, or else premature failure of the core will occur. An additional requirement of the connector is that it must be designed to retain the outer strands of the cable without damage and again in order to achieve a 95% desired rated strength of the cable.

An example of a prior art cable connector includes U.S. Pat. No. 3,384,704, issued to Vockroth, and which teaches a high tensile electrical connector for joining stranded cables. Vockroth includes an outer ferrule with a pair of tapered gripping jaws disposed in spaced relationship to the ends of the ferrule. The jaws grip the core strands of the cables to establish the desired mechanical connection, and the ferrule is subsequently gripped at both ends onto the connector strands of the cable to establish the electrical connection. During crimping, the conductor strands and the ferrule extrude longitudinally and pull the core strands and jaw into tighter engagement.

A further example of a wedge dead end to support aerial cables is disclosed in U.S Pat. No. 5,647,046, issued to Cowen, and which includes an assembled frame with an attaching cable for mounting to the support structure and two wedges that slide into the frame. The frame further consists of two parallel plates, each plate including two tapered and opposingly angled slots. The wedges are similarly tapered enabling them to be locked with the side plates and both also include a groove sized and textured to grip a specified cable. The wedges can be designed to compress the encased cable evenly along the entire contact surface of the wedge or with varying force along such surface.

SUMMARY OF THE INVENTION

The present invention discloses a compression connection assembly for use in both dead-end and mid-joint conductors, such as are further typically employed in transmission line installations. Also disclosed is a method for constructing such a connection assembly.

The connection assembly includes the provision of an aluminum sleeve insert in disposed fashion between the outer steel tube and the inserted composite core, the aluminum insert providing the combined characteristics of increased ductility and rate of extrusion (versus the steel sleeve) and in order to prevent force misalignments to the core (during the compression of the steel tube) which will result in subsequent failure of the connector assembly when it is placed under tension. This is in large measure due to the ductile characterstics of the aluminum insert which, during forced die compression of the outer steel tube, redistributes in interstitial filling manner within the spaces created between the core wires, as well as extruding beyond the annular disposed end of the steel tube and in order to achieve desired stress relieving between the interiorly held core and compression length.

A current carrying cable, such as is known in the art, includes a plurality of outer strands and a central extending plurality of inner strands and which are inserted within the aluminum sleeve prior to the compression forming operation of the steel tube. An outer tubular body is preferably constructed of a conductive and current carrying material such as aluminum and is slidably engaged over the assembled tube and sleeve upon the same being fixed to the central plurality of cable strands.

The outer tubular body is configured in either a dead-end application, and which includes a forged and extending eyelet for connecting an extending end of one cable to such as an aerial tower or pole. Alternatively, the outer tubular body is configured in a joint application for interconnecting opposingly extending ends of first and second cables, such as in mid-span between spaced apart towers or poles.

BRIEF DESCRIPTION OF THE DRAWINGS

FIG. 4 is an exploded perspective of a compression joint connector according to a further preferred embodiment of the present invention and which illustrates an alternately configured steel tube, as well as a pair of oppositely and axially inserting aluminum sleeves;

FIG. 5 is a succeeding perspective view according to the embodiment of FIG. 4, in which the pair of aluminum sleeves are arrayed in opposite end inserted fashion within the steel tube, and further illustrating in partially exploded fashion the manner of insertion of first and second extending ends of associated transmission cables, both again including outer wire strands and inner and extending composite cores;

FIG. 6 is a further succeeding perspective view, again in partially exploded fashion, of the embodiment of FIGS. 4 and 5 and illustrating the axial end insertion of the assembled connector within an outer tubular body associated with the joint connection;

DETAILED DESCRIPTION OF PREFERRED EMBODIMENTS

Figure 1:
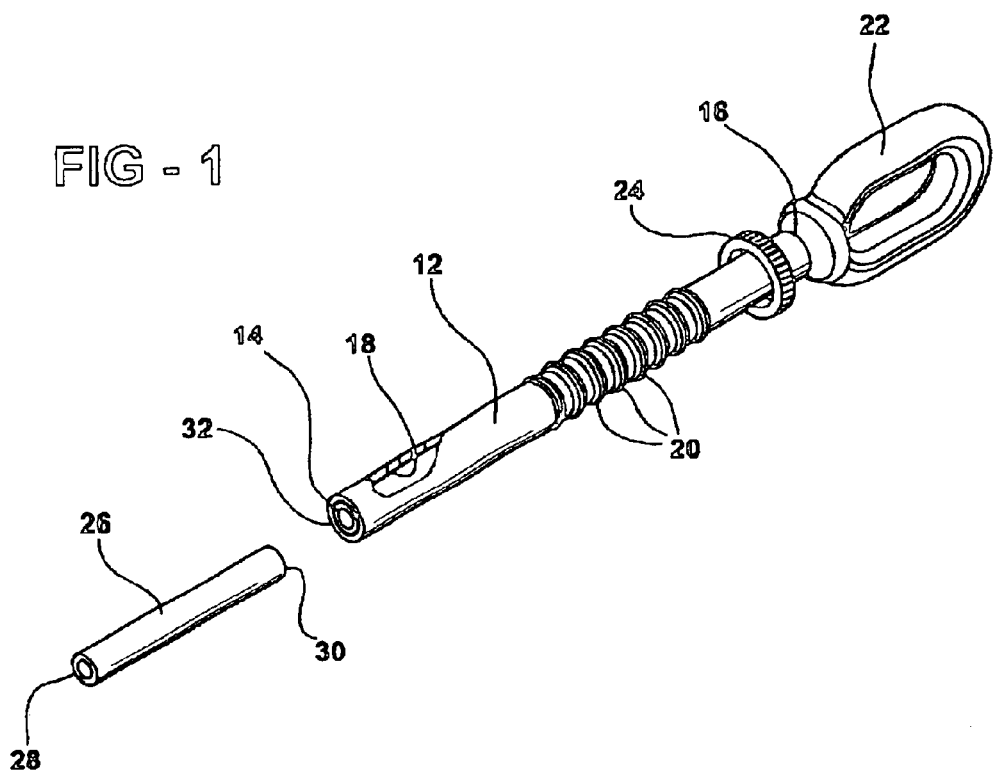
FIG. 1 is a perspective illustration in partially exploded fashion of a compression dead end connector according to a first preferred embodiment of the present invention and which illustrates the steel tube with end attachable steel eye forging, as well as the aluminum insert for inserting into an opposite end of the steel tube.
Figure 2:
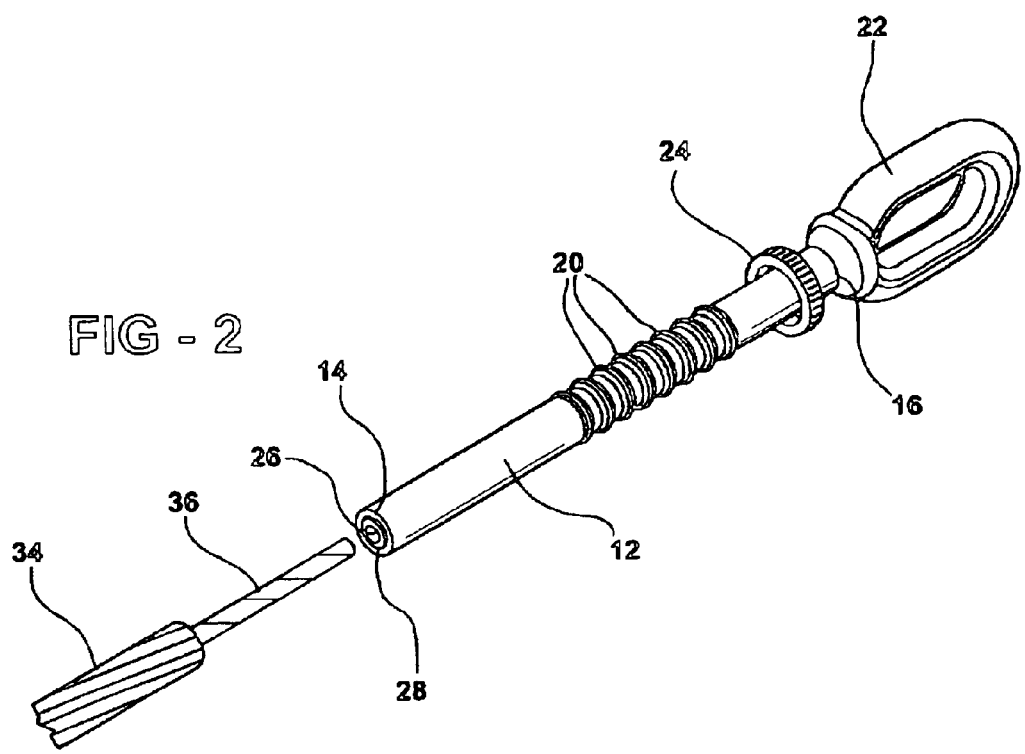
FIG. 2 is a succeeding perspective view according to the embodiment of FIG. 1, in which the aluminum sleeve is arrayed in end inserted fashion within the steel tube, and further illustrating in partially exploded fashion the manner of insertion of the transmission cable with both outer wire strands and inner composite core.

Referring now to the various figure illustrations, a compression connection assembly is illustrated for use in both dead-end and mid-joint conductors. As previously described, such joint and dead-end connections are further typically employed in transmission line installations and are particularly suited for use with composite conductors assemblies. As will also be described, the present invention additionally discloses a method for constructing such a connection assembly.

Referring to FIGS. 1–3 and 7, a series of illustrations are shown of a compression dead end connector according to a first preferred embodiment 10 (see in particular completed assemblies in FIGS. 3 and 7) of the present invention. An elongated and interiorly hollow tube 12 is provided, the tube having a first end 14 and a second end 16 and a desired polygonal (hexagonal, circular, etc.) cross sectional shape. The tube 12 in the preferred embodiment is constructed of a suitable carbon steel material, however further may be constructed of any metallic and conductive material having specified rates of ductility and extrusion.

The steel tube 12 according to the first preferred embodiment is configured for particular application to a dead-end connection, specifically such as which connects to an overhead tower or pole. The tube 12 includes such particular features as a selected interior diameter 18 (see cutaway portion in FIG. 1) and a plurality of spaced apart and accordion-like corrugations 20 extending along a selected axial length of the tube 12. Yet additional features include a heavy duty eyelet 22, such as a steel eye forging, integrally formed with and extending from the tube second end 16, as well as a felt washer 24 slidably engaged over the tube and inter-disposed between the spaced apart corrugations 20.

An aluminum sleeve 26 is provided and includes a first end 28 and a second end 30. The sleeve 26 further exhibits a selected outer diameter no greater than the interior diameter 18 of the tube 12 and such that the sleeve 26 is capable of being axially inserted through a selected end and into the tube with little or no effort. In a preferred application, a suitable grit material 32, such as a silicone carbide or other material exhibiting a desired particulate size and consistency, is applied along the interior diameter 18 of the outer steel tube 12, such as proximate to the inserting end 14 for receiving the aluminum sleeve 26. The grit material 32 operates to maintain a hold on the inserted sleeve 26 and also adds to the holding strength subsequently established between the heavy-duty eyelet 22 and the aluminum sleeve 26.

The sleeve 26 is, in the preferred embodiment, again constructed of a suitable aluminum material, however it is again understood that the sleeve may further may be constructed of any metallic and conductive material having further specified rates of ductility and extrusion which are a predetermined value greater than the corresponding rates of ductility and extrusion of the outer steel tube 12. As again illustrated in the succeeding perspective illustrations of FIG. 2, the sleeve 26 is shown inserted into the associated end 14 of the outer tube 12 and so that the grit material 32 (again FIG. 1) holds the sleeve in place.

Referring again to FIGS. 2, 3 and 7, a current carrying cable is provided and includes a plurality of, typically helically wound, outer strands 34 and a central extending plurality of inner and helically wound and extending strands 36 (such as also referred to as an inner composite core). In the preferred application, the composite conductor typically includes such as high temperature aluminum utilized in the wound outer strands 34, whereas the inner and extending layers 36 or core is constructed of aluminum matrix composite wires. It is again understood that the material construction and composition of the outer 34 and inner 36 strands of the cable can very according to the application desired.

Figure 3:
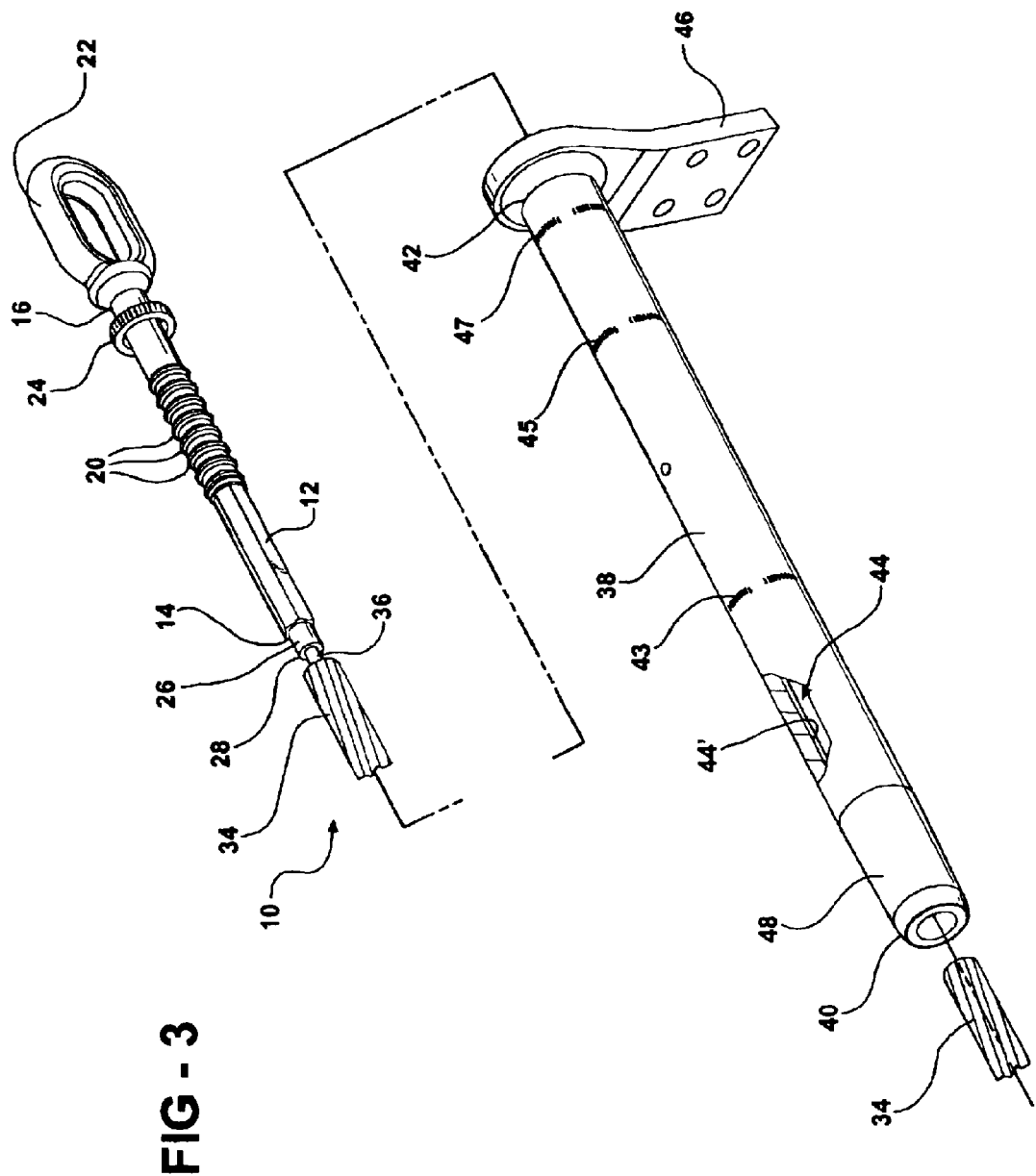
FIG. 3 is a further succeeding perspective view, again in partially exploded fashion, and illustrating the axial end insertion of the assembled connector within an outer tubular body associated with the dead end connection.
Figure 7:
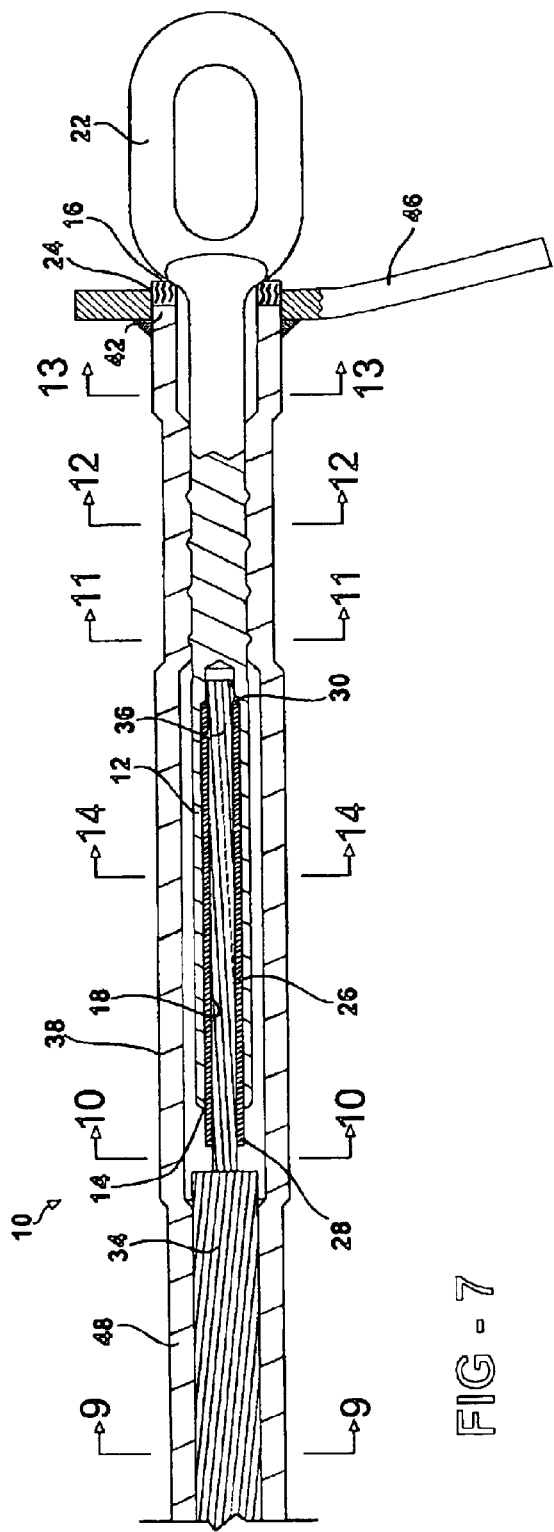
FIG. 7 is a cross sectional cutaway of the compression dead end connector as illustrated in FIG. 3 and further showing the manner in which the axially disposed corrugations on the steel tube are compressed to interengage with the inner annular surface of the outer tubular body.

As again illustrated in both FIGS. 3 and 7, the extending central plurality of strands 36 (also again known as the inner composite core) is inserted within the end 28 of the aluminum sleeve 26, such as which is proximate the coaxially and outer disposed end 14 of the outer steel tube 12. At this point, a mechanical compression operation is performed on the outer steel tube 12, interiorly held aluminum sleeve 26, and inserted centrally extending plurality of wire strands 26. Although not shown, it is understood that a suitable compressor, such understood to include first and second opposing and mating dies for receiving therebetween the outer steel tube 12. The mechanical compressor may be rated to any suitable pressure application, such capable of exceeding 10,000 pounds per square inch (psi) and it is also understood that the mechanical compression forming operation also provides the effect of reducing the overall area of the steel tube 12.

Having given above a general description of the outer tube 12, inserted sleeve 26 and inwardly extending central core (inner strands 36) of the composite cable, an explanation will now be given as to the properties of the aluminum sleeve 26 during the mechanical compression of the tube 12. In particular, it is again known that the steel tube 12 exhibits an extrusion rate less than that of the aluminum tube 26, by virtue of the material contents of the respective components.

Accordingly, and upon the compressing and area reducing force being applied to the outer steel tube 12 by the dies, the aluminum sleeve 26 extrudes at a rate greater than the compressing tube 12 and such that aluminum material associated with the sleeve both fills any irregularities and voids existing between the centrally extending inner strands 36. Additionally, the increased rate of extrusion of the sleeve 26 establishes stress relief between the inner strands 36 and the steel tube 12 and this is further achieved by the aluminum material extruding beyond the associated end 14 of the tube 12.

Referring again to the perspective of FIG. 3 and the cutaway of FIG. 7, an outer tubular body 38 is provided and includes a first end 40, a second end 42 and a specified interior diameter 44. The outer body 38 is constructed of suitable metallic and current conductive material, such as preferably aluminum and in this embodiment is also known as an outer dead-end connector body. The interior diameter 44 of the tubular body 38 also preferably includes the provision of a sleeve 44 which is also preferably constructed of aluminum and may be factory installed during the initial assembly of the outer tubular body 38. Also illustrated is a tongue 46, which is typically a welded portion of the outer body 38, and is also constructed of aluminum and operating as a current carrying terminal as will be shortly explained.

During the initial application and compression forming of the steel tube 12, aluminum sleeve 26 and central extending wire strands 36 of the cable, the outer dead end body 38 is typically pre-applied in coaxial fashion over the outer strands 34 of the cable and is typically positioned a suitable distance from the central extending strands 36. Following the mechanical compressing and area reducing operation performed on the steel tube 12 (in which it is mechanically shaped from the circular section of FIGS. 1 and 2 to the substantially hexagonal compressed and formed configuration in FIG. 3) and aluminum sleeve 26, the outer dead end and tubular body 38 is slidably engaged over the assembled tube and sleeve in the manner substantially illustrated in the sectional cutaway of FIG. 7.

A succeeding and mechanically compressing operation is applied at axially spaced locations indicated at 43, 45 and 47 and along the length of the outer body 38. The compressing operations typically progresses along the axial length of the body 38, to its ends 40 and and 42 and to relieve built up stresses in the assembly, however it is understood that no compressing forces are applied between the axial locations 43 and 45, this corresponding to the positioning of the internally inserted tube 12 and sleeve 26. A still further compressing operation is then performed to an edge adjoining and inwardly tapered section of the outer body (see at 48 in FIGS. 3 and 7) and as with the compressing operations of 43, 45 and 47, mechanically secures the outer tubular body 38 around the outer extending strands 34 of the composite conductor cable as well as relieving stress forces along the assembly.

Referring once again to the assembled compression dead end connector, illustrated in cross sectional cutaway in FIG. 7, further reference is made to the manner in which the axially disposed corrugations 20 on the steel tube 12 are compressed, and radially outwardly deflected, to interengage with the opposing and inner annular surface of the outer tubular body 38. This is typically accomplished through applying a specified inward compressing and axial force to the tube 12 and from the heavy duty end extending eyelet 22.

In operation, and upon completed assembly of the compression dead end connector, a jumper terminal (not shown) is connected to the extending tongue 46 of the outer dead end body 38. An insulator string, not shown, is also associated with the aerial tower or pole (also again not shown) at the dead end connection and, by its insulating properties, prevents current from passing from the steel eyelet forging 22 and into the pole or tower. Accordingly, the current transfer occurs from the composite cable, through the assembly and across the outer tubular body, and finally through the tongue and to the connected jumper terminal.

Figure 8:
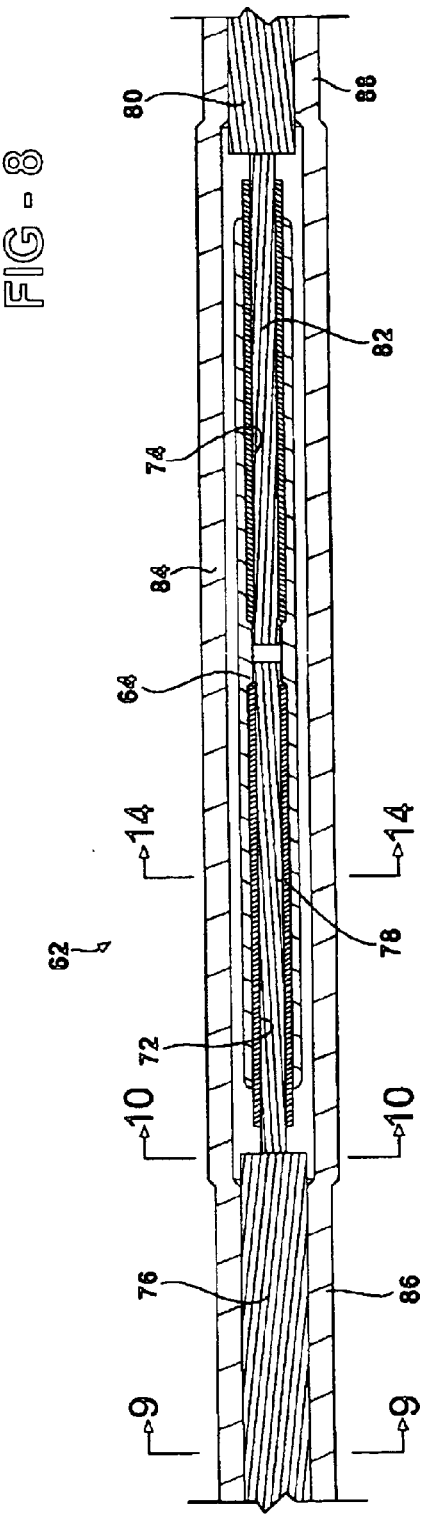
FIG. 8 is a corresponding cross sectional cutaway of the compression joint connector as illustrated in FIG. 6 and showing the manner in which the interconnecting ends of the succeeding transmission cables are secured within the outer tubular body.
Figure 9:
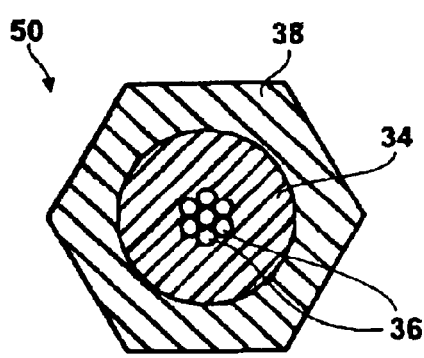
FIG. 9 is a cutaway view taken along line 9—9 of both FIGS. 7 and 8 and illustrating a cross sectional illustration of an end portion of either outer tube (dead end or joint) in compressed fashion about the outer associated strands of the selected transmission cable.
Figure 10:
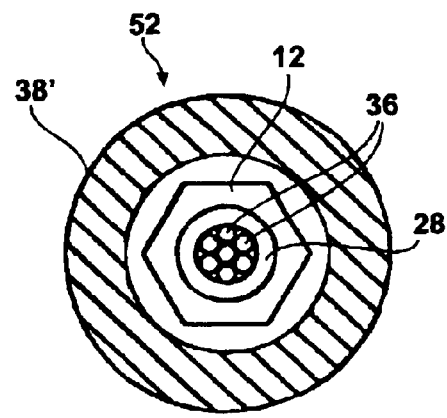
FIG. 10 is a cutaway view taken along line 10—10, again in both the dead end and joint embodiments of FIGS. 7 and 8, and illustrating the core load transferring section of either connector assembly.
Figure 12:
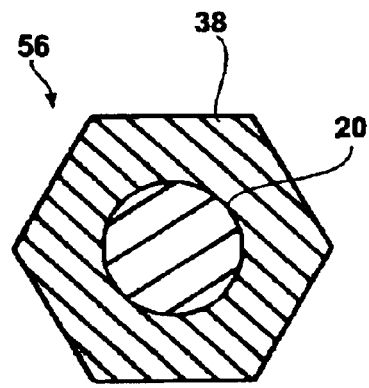
FIG. 12 is a cutaway view taken along line 12—12 in the dead-end connector embodiment of FIG. 7, similar to that illustrated and in the cutaway of FIG. 11 and illustrating the compression of the outer tubular body over an established corrugation, and once again which establishes a desired percentage of area reduction and area compression.
Figure 13:
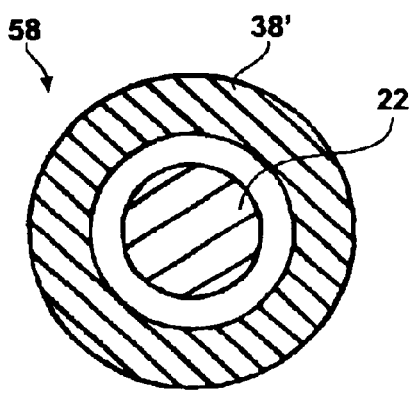
FIG. 13 is a cutaway view taken along line 13—13 in the dead-end connector embodiment of FIG. 7, and illustrating the uncompressed barrel section of the outer tubular body engaged over the steel eye forging.
Figure 14:
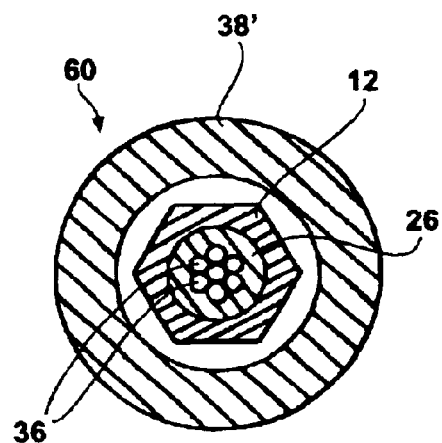
FIG. 14 is a cutaway view taken along line 14—14, again in both the dead end and joint embodiments of FIGS. 7 and 8, and illustrating the manner in which the steel tube and inserted aluminum sleeve are compressed onto the conductor core.

Referring now to FIGS. 9–14, a series of individual cutaway views are shown of specified axial locations of the compression dead end connector 10 illustrated in the cutaway of FIG. 7. Each of the cutaway views of FIGS. 9, 10, 11, 12, 13 and 14 are also illustrated for the dead-end connector of FIG. 7, it being further understood with subsequent reference to the embodiment of FIG. 8, to be shortly described, that the sectional views of FIGS. 9, 10 and 14 are common to that embodiment.

Referring to FIGS. 9–14 in succession, FIG. 9 first references at 50 a cross sectional illustration of an end portion of the outer tube 38 in compressed fashion about the outer associated outer strands 34 of the composite transmission cable. As shown by this cross section, the cross sectional configuration of the outer tube 38 may be polygonal, such as hexagonal, and it is also understood that circular and other configurations are also possible. As is also understood at this cross section, the outer tube 38 is designed to hold the strength of the outer aluminum strands 34 of the composite connector cable and further exhibits the necessary current carrying properties to transfer the amperage from the conductor.

The tube and conductor combination are understood to be designed so that each exhibits a desired percentage of area reduction and area compression within established limits, and while the cross section at this location is free of any voids which would tend to allow moisture to travel up the conductor and into the assembly. It is desired that length of compression over the conductor must be adequate to maintain a grip with slippage, such occurring when the conductor is tensioned to 95% of its rated strength in use. In this fashion, it is ensured that the connector will meet the electrical and mechanical performance requirements without the need to repetitively test each and every assembly.

Referring now to FIG. 10, a further cutaway view is shown at 52 and illustrates the core load transferring section of the connector assembly. In particular, this section is designed to yield or elongate at a specific tension, thus effectively "loading" the core. The tube cross section must further be designed such that, upon a load being applied to the conductor which is determined to be at rated breaking strength (RBS), a resulting core (strands 36) strain occurs typically in the area of 0.002 to 0.006 in/in, thus assuring that the core is loaded at high tensile loads. The outer tubular body is further illustrated in a generally circular cross section 38' in FIG. 10.

Figure 11:
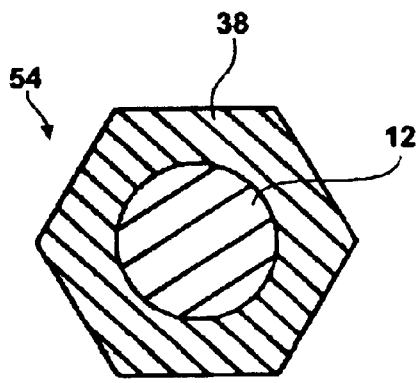
FIG. 11 is cutaway view taken along line 11—11 in the dead-end connector embodiment of FIG. 7, and illustrating in cross section the manner of compression of the outer tubular dead end body over the crest configuration of the steel eye forging, and in which such section establishes a desired percentage of area reduction and area compression.

FIG. 11 illustrates at 54 the manner of compression of the outer tubular dead end body 38 over the crest configuration of the steel eye forging (outer tubular body 12) and in which the section establishes a desired percentage of area reduction and area compression. FIG. 12 illustrates, at 56, the compression of the outer tubular body 38 over an established corrugation 20 of the steel tube 12 and once again which establishes a desired percentage of area reduction and area compression. FIG. 13 is a cutaway view illustrated at 58 of the uncompressed barrel section of the outer tubular body, see again 38', engaged over the base of the steel eye forging 22 integrally formed with the outer steel tube 12.

Finally, FIG. 14 is a cutaway view shown at 60 illustrating the manner in which the steel tube 12 and inserted aluminum sleeve 26 are compressed onto the conductor core (see again central extending composite strands 36). As with the compression connection established between the outer dead end tubular body 38 and the outer extending strands 34 of the composite terminal cable, the tube 12, sleeve 26 and core 36 is designed to have a percentage area of reduction and percentage area of compression within established limits and in order to ensure the mechanical performance of the compression connection. Furthermore, the cross section at this location must again be free of voids, such in particular that during the mechanical compress and area reduction the tube will not tend to bend or buckle. Again, the length of compression over the core strands 36 must be adequate to maintain a grip on the conductor core, without slippage, when the cable is tensioned to 95% of its rated strength.

Referring now to the succeeding perspective illustrations of FIGS. 4–6, as well as the fully assembled and sectional cutaway of FIG. 8, a connector assembly is illustrated at 62 (see again in particular FIGS. 6 and 8) according to a second preferred embodiment. The assembly 62 operates as a compression joint connector, this contrasting from the dead-end connector assembly 10 in the assembly 62 instead is intended to interconnect first and second composite terminals in the manner to now be described.

In particular, a steel tube 64 is again provided and which includes a first end 66, a second end 68, and a specified interior diameter 70. A pair of aluminum sleeves 72 and 74 are again provided, substantially as previously described at 26, and such that the sleeves 72 and 74 are inserted within the opposite ends 66 and 68 of the steel tube 64. As in the first preferred embodiment, a grit particulate 66 is applied along the inner diameter 70 of the steel tube 64 and in order to assist in securing the sleeves 72 and 74 in their oppositely inserting fashion.

FIG. 5 illustrates the pair of aluminum sleeves 72 and 74 in opposite end inserted fashion within the steel tube 64. FIG. 5 further illustrates in partially exploded fashion the manner of insertion of a first composite transmission cable (see outer strands 76 and central extending strands 78) and a second transmission cable (see outer strands 80 and central extending strands 82).

Referring now to FIG. 6, the axial end insertion of the assembled connector within an outer tubular body 84 associated with the joint connection is illustrated. As with the corresponding outer dead end connector body 38 in the first preferred embodiment, the joint connector outer body 84 is constructed of a metallic (typically aluminum) material and is pre-coaxially applied over the outer strands 76 or 80 of a selected transmission connector prior to the initial mechanically compressing and area reducing of the outer tube 64 about the inserted aluminum sleeves 72 and 74 and inserted central wire strands (cores) 78 and 82 of the terminals.

A sleeve 81, typically thin-walled and also constructed of aluminum, is slidably engaged over the transmission cable (outer strands 80) as shown in exploded fashion in FIG. 5 and assembled fasion in FIG. 6. During final assembly, the sleeve 81 slides into the associated end 83 of the outer body 84 and resides flush with the end.

As with the first preferred embodiment, the outer steel tube 64 is mechanically compressed and area reduced, such as from an initial circular configuration to a succeeding and hexagonal compressed/area reduced shape configuration. The extrusion properties of the pair of inserted aluminum sleeves 72 and 74, relative to the steel outer tube 64, are identical to that described with reference to the aluminum sleeve 26 in the dead-end connector configuration and such that they combine to both fill voids and irregularities occurring at both of the opposingly extending central wire strands/cores 78 and 82 of the associated terminal connectors, as well as further extruding from the opposite ends of the tube 64 in order to provide stress relief between the cores and compressed tube.

Referring again to FIG. 8, an assembled view is shown in cutaway of the compression joint variant 62. In particular, and upon completed assembly of the connector the outer tube 84 is slided back in place over the compressed tube 64 and sleeves 72 and 74. As with the outer dead end connector 38 in the first embodiment, additional compressing operations occur at locations 86 and 88 (FIG. 6) and in axially outwardly extending fashion to the opposite ends of the tube 84. End tapered sections 87 and 89 of the outer joint connector body 84 (and which are proximate the opposite ends of the body 84) are concurrently compressed in a secondary mechanical operation (just as previously described with reference to edge section 48 of the dead end tubular body 38 of the first preferred embodiment) and in order to fix the outer tube to the associated outer strands 76 and 80, respectively, of the terminal cables as well as to relieve stresses along the assembly.

In operation, the compression joint connector 62 functions in the identical manner as the corresponding dead-end connector, and with the same performance ratings and requirements. As again stated with respect to the disclosure of the first preferred embodiment, a desired 95% of the rated strength of the cores (again central extending and wound pluralities of wires 78 and 82) is desired during subsequent tensioning resulting in use. As also stated in the previous description of the cutaway section of FIG. 7 for the dead end compression connector, the previously described cutaway illustrations of FIGS. 9, 10 and 14 are also illustrated in FIG. 8 and their respective and previous descriptions are herein again incorporated by reference.

As also described previously, a method of constructing a connector assembly for use in transmission line installations is also disclosed. The method includes the step of providing an elongated and interiorly hollowed tube having a selected interior diameter, a first end and a second end, the tube further being constructed of a first metallic material (e.g., steel) exhibiting a determined rate of extrusion, as well as providing at least one sleeve having a selected outer diameter no greater than the interior diameter of the tube and being constructed of a second metallic material (e.g., aluminum) exhibiting a rate of extrusion greater than that of the elongated tube.

Additional steps include axially inserting the sleeve(s) into the interior diameter of the tube, providing a current carrying cable including a plurality of outer strands and a central extending plurality of inner strands extending beyond the outer strands, and inserting the central extending plurality of cable strands (of either the single cable in the compression dead end connection or opposed pair of cables in the compression joint connection) within the sleeve(s). Yet additional steps include mechanically compressing the elongated tube so that the inserted sleeve(s) concurrently extrude at a rate greater than the compressing tube and such that the second metallic material (aluminum) associated with the sleeve(s) both fill irregularities and voids existing between the centrally extending inner strands, as well as establish stress relief between the inner strands (of the core or cores) and the outer tube. Completed assembly steps include providing an outer tubular body having a selected interior diameter, a first end and a second end, the outer body being constructed of a metallic and current conductive material (aluminum) and then slidably engaging the outer tubular body over the interiorly hollowed tube and assembled sleeve.

As disclosed substantially in the previous description of the compression connector assemblies, yet additional method steps include mechanically compressing the outer tubular body against the outer strands of the current carrying cable and applying a grit material along the inner diameter of the elongated tube and prior to axial insertion of the sleeve(s). Other steps include securing a terminal application tongue to a selected end of the outer tubular body in the dead-end compression connection, as well as forming a plurality of axially spaced apart corrugations along an exterior diameter of the compressing steel tube along with an eyelet extending from a selected end of the tube proximate to said plurality of spaced apart corrugations. The step of axially compressing the steel tube, such that the corrugations compress and radially expand to fixedly engaging against the interior diameter of said outer tubular body, complete the method assembly of the invention.

Having described the presently preferred embodiments, it is to be understood that the invention may be otherwise embodied within the scope of the appended claims.

What is claimed is:

1. A connector assembly for use in transmission line installations, said connector assembly comprising:

an elongated and interiorly hollowed tube having a selected interior diameter, a first end and a second end, said tube being constructed of a first metallic material exhibiting a determined rate of extrusion;

at least one sleeve having a selected outer diameter less than said interior diameter of said tube and such that said sleeve is capable of being axially inserted through said first end and into said tube, said sleeve being constructed of a second metallic material exhibiting a rate of extrusion greater than that of said elongated tube;

a current carrying cable including a plurality of outer strands, a central extending plurality of inner strands extending beyond said outer strands and inserting within said sleeve;

said elongated tube being subjected to mechanical compression and area reducing procedure, said sleeve extruding at a rate greater than said elongated tube and such that said second metallic material associated with said sleeve establishes stress relief between said inner strands and said tube; and an outer tubular body having a selected interior diameter, a first end and a second end, said outer body being constructed of a metallic and current conductive material and is slidably engaged over said tube.

2. The connector assembly as described in claim 1, further comprising said outer tubular body being constructed of an aluminum material.

3. The connector assembly as described in claim 1, said outer tubular body further comprising a dead end connector body, a terminal application tongue extending from a selected end of said outer tubular body.

4. The connector assembly as described in claim 3, said elongated tube further comprising a plurality of axially spaced apart corrugations such that, upon an axial compression of said tube, said corrugations radially outwardly deflect to fixedly engage against said interior diameter of said outer tubular body.

5. The connector assembly as described in claim 4, further comprising an eyelet extending from a selected end of said tube and beyond said outer tubular body.

6. The connector assembly as described in claim 5, said eyelet further comprising a steel eye forging having a selected shape and dimension and which is adapted to engage and insulator string associated with the transmission line installation.

7. The connector assembly as described in claim 1, further comprising a grit material applied to said interior diameter of said elongated tube, said grit contributing to the retention of said sleeve.

8. The connector assembly as described in claim 7, said grit exhibiting a given particulate size and consistency and further comprising a silicone carbide material.

9. The connector assembly as described in claim 1, said elongated tube further comprising a carbon steel material content, said sleeve further comprising an aluminum material content.

10. The connector assembly as described in claim 9, further comprising a secondary compression forming operation applied to at least one axial location of said outer tubular body and progressively towards an end of said outer body about said outer strands of said current carrying cable.

11. The connector assembly as described in claim 10, further comprising said secondary compression forming operation establishing a stress relieving area between said central extending strands and said inner strands of said transmission cable relative said outer body.

12. The connector assembly as described in claim 1, a pair of sleeves inserting into said first and second ends of said elongated tube, a pair of current carrying cables including first and second central extending strands inserting into said sleeves.

13. The connector assembly as described in claim 12, said outer tubular body further comprising a joint connector body.

14. The connector assembly as described in claim 13, further comprising a secondary compression operation applied to said first and second ends of said outer tubular body about said outer strands associated with said first and second cables.

15. A method of constructing a connector assembly for use in transmission line installations, said method comprising the steps of:

providing an elongated and interiorly hollowed tube having a selected interior diameter, a first end and a second end, said tube being constructed of a first metallic material exhibiting a determined rate of extrusion;

providing at least one sleeve having a selected outer diameter less than said interior diameter of said tube, said sleeve being constructed of a second metallic material exhibiting a rate of extrusion greater than that of said elongated tube;

axially inserting said sleeve into said interior diameter of said tube;

providing a current carrying cable including a plurality of outer strands, a central extending plurality of inner strands extending beyond said outer strands;

inserting said central extending plurality of cable strands within said sleeve;

mechanically compressing said elongated tube, said sleeve concurrently extruding at a rate greater than said compressing tube and such that said second metallic material associated with said sleeve establishes stress relief between said inner strands and said tube;

providing an outer tubular body having a selected interior diameter, a first end and a second end, said outer body being constructed of a metallic and current conductive material; and slidably engaging said outer tubular body over said tube.

16. The method as described in claim 15, further comprising the step of mechanically compressing said outer tubular body at specified axial locations therealong in stress relieving fashion between said central extending strands and said inner strands of said transmission cable and relative said outer body.

17. The method as described in claim 15, further comprising the step of applying a grit material along said inner diameter of said elongated tube and prior to axial insertion of said sleeve.

18. The method as described in claim 15, further comprising the step of securing a terminal application tongue to a selected end of said outer tubular body.

19. The method as described in claim 15, further comprising the step of forming a plurality of axially spaced apart corrugations along an exterior diameter of said tube, an eyelet extending from a selected end of said tube proximate to said plurality of spaced apart corrugations.

20. The method as described in claim 19, further comprising the step of axially compressing said tube, said corrugations fixedly engaging against said interior diameter of said outer tubular body.

* * * * *